United States Patent [19]

Thomson

[11] 4,222,365
[45] Sep. 16, 1980

[54] HEAT STORAGE SYSTEM AND METHOD

[75] Inventor: Wallace B. Thomson, Northridge, Calif.

[73] Assignee: Rockwell International Corporation, El Segundo, Calif.

[21] Appl. No.: 912,678

[22] Filed: Jun. 5, 1978

[51] Int. Cl.³ .................. F24H 7/00; F28D 21/00; F24J 3/02
[52] U.S. Cl. .................................. 126/400; 126/436; 126/435; 60/659; 165/1; 165/104 S; 165/DIG. 4
[58] Field of Search ............... 126/270, 271, 400, 430, 126/436, 435; 237/1 A; 165/104 M, 104 S, 18, DIG. 4, 107, 97; 60/659

[56] References Cited

U.S. PATENT DOCUMENTS

| | | | |
|---|---|---|---|
| 3,369,541 | 2/1968 | Thomason | 165/104 S |
| 3,382,917 | 5/1968 | Rice | 126/270 |
| 3,400,249 | 9/1968 | Mekjean et al. | 126/400 |
| 3,812,903 | 5/1974 | Thomason | 126/400 |
| 4,029,081 | 6/1977 | Strong | 126/400 |
| 4,124,061 | 11/1978 | Mitchell et al. | 165/DIG. 4 |
| 4,137,898 | 2/1979 | Koizumi et al. | 126/400 |
| 4,146,057 | 3/1979 | Friedman et al. | 60/659 |

*Primary Examiner*—James C. Yeung
*Attorney, Agent, or Firm*—L. Lee Humphries; Henry Kolin; Clark E. DeLarvin

[57] ABSTRACT

A thermal energy storage system and method for storing substantial quantities of heat for extended periods of time. The system includes a heat collecting liquid which is in a heat-exchange relationship with a source of heat or thermal energy, a housing containing a large volume of particulate material such as rocks for the storage of thermal energy, a heat transfer gas in a heat-exchange relationship with the rocks and means for causing the heat collecting liquid and the heat transfer gas to flow in counter-current, indirect heat-exchange relationship with one another, the means further includes provisions for reversing the direction of flow of the liquid and gas for the introduction and removal of heat from a portion of the body of rock. There further is provided a working fluid and means for passing the working fluid and heat collecting liquid in indirect, heat-exchange relationship with one another for the transfer of heat to the working fluid, and a means operatively associated with the working fluid to extract energy therefrom. In a particularly preferred embodiment, the source of heat comprises a solar heat collector which uses a liquid alkali metal as the heat collecting liquid and the preferred heat transfer gas comprises air.

11 Claims, 2 Drawing Figures

HEAT STORAGE SYSTEM AND METHOD

BACKGROUND OF THE INVENTION

1. Field of the Invention

The present invention relates to the storage of heat in substantial quantities over relatively long periods of time. The invention particularly relates to the collection and storage of solar heat for use in a utility power plant.

2. Prior Art

With the advent of the energy crisis there has been substantial emphasis placed on the utilization of the so-called "non-exhaustible" sources of energy such as solar heat. One of the principal problems associated with effective utilization of solar heat has been the cost of storing significant quantities of such heat for use during non-daylight hours or during extended periods when the sun was obscured by cloudy or overcast skies. Indeed, the high cost of construction of storage systems has minimized the effective utilization of solar heat. In general, large volumes of storage media are absolutely essential. At the present time, the cost of providing storage devices of adequate size has proved to be a limiting factor in the utilization of solar heat for other than small scale domestic or residential space and water heating applications.

A typical residential system for the utilization of solar energy is shown in U.S. Pat. No. 4,029,082. The system comprises a storage bin containing heat storage material and a means for channeling air in sequence from a space to be warmed through the storage bin to pick up heat at a low temperature. The warm air is returned to the space to be warmed. Patentees further suggest the addition of water to the air and the storage bin to act as an additional source of heat storage as well as providing humidity to the air.

U.S. Pat. No. 3,989,927 describes another heat storage system for use in space heating which comprises a container having walls formed of a heat resistant material and including a guide duct in the form of a tube extending through the container for carrying a gaseous heat extraction medium. The container also contains heat storage medium comprising heavy metal bearing minerals in the form of a pourable bulk of particulate solids suitable for directly contacting with air to be heated for places of human habitation.

U.S. Pat. No. 4,024,910 discloses a system for the storage of heat or cold to be utilized in maintaining a desired temperature in habitable areas. The system utilizes a plurality of channels dug directly into the earth and filled with rocks which are used to absorb heat or cold for storage; a part of the storage being the rocks themselves and usually a much larger part being the adjacent earth. Suitable conduit connections are provided for carrying heat or cold to the rocks.

The foregoing systems, while of interest for residential space heating or even space heating of commercial buildings, do not address the problem faced by a utility industry where a high temperature heat source is required. Thus, others have developed systems in an attempt to provide a heat storage system which would be suitable for use, for example, by a commercial utility power plant.

U.S. Pat. No. 2,933,885 discloses a heat storage accumulator system which comprises a closed loop circuit containing a heat transmitting fluid and including an isolated heat accumulator for the circuit. The heat accumulator contains a heat absorbent medium having a melting point between the low and high temperature limits of the fluid in the closed loop circuit.

U.S. Pat. No. 3,178,113 discloses a heat storage system particularly adapted to space installations. The system is made up of two interconnecting systems, one of which constitutes an energy absorber and heat storage and release unit, and the other comprises a conversion system by which the heat is converted to electricity. The collection and storage system includes a heat energy collector or convertor for collecting heat from the rays of the sun which are reflected onto a boiler. The boiler is in a circuit which includes a heat storage devices. The system also includes appropriate valves and controllers for maintaining a substantially constant, desired temperature in the circuit.

U.S. Pat. No. 2,593,963 relates to a binary cycle power plant and utilizes a high melting point tertiary fluid for indirect heating. The proposed system, however, does not provide for the storage of heat, though it does suggest the use of a liquid alkali metal as a fluid heat transfer medium.

Other patents considered during the preparation of this application but not considered sufficiently pertinent to warrant further discussion are U.S. Pat. Nos. 2,680,437; 3,983,929; 3,957,030; 3,968,653; 3,977,197; 3,993,041; and 4,038,555.

SUMMARY OF THE INVENTION

In accordance with the present invention, there is provided a thermal energy storage system and a method for storing substantial quantities of heat over extended periods of time. The present invention is applicable to excess heat from, for example, a nuclear reactor or a conventional coal-fired furnace. The present invention, however, is particularly suited for use with a solar thermal energy source such as the large scale central receivers proposed for supplying heat to an electric utility plant. Broadly, the system comprises a heat collecting liquid in heat-exchange relationship with a source of heat, a housing containing a large volume of particulate material such as rocks for the storage of thermal energy, a heat transfer gas in a heat-exchange relationship with the rocks and a means for causing the collecting liquid and the heat transfer gas to flow in a counter-current, indirect, heat-exchange relationship with one another. Such means further includes provisions for reversing the direction of flow of the heat collecting liquid and the heat transfer gas for the introduction and removal of heat from the body of rocks. There further is provided a working fluid and a means for passing the working fluid and heat collecting liquid in indirect, heat-exchange relationship with one another for the transfer of heat from the heat collecting liquid to the working fluid to extract energy therefrom.

In accordance with the present method, a heat collecting liquid is passed in heat-exchange relationship with the source of heat such as a solar collector and thereafter is passed in a counter-current, indirect, heat-exchange relationship with a heat transfer gas to receive from or transmit heat to the heat transfer gas. The direction of flow of the heat transfer gas in turn is passed through a bed of rocks. The direction of flow of the heat transfer gas and heat collecting liquid are reversible such that heated heat transfer gas is always introduced or withdrawn from an upper portion of the bed of rocks. Further, the volume of the bed of rocks and flow rate of the heat transfer gas are adjusted such that the apparent velocity of the gas flowing through the bed is within the range of from about 1 to 6 feet per second. The height of the bed preferably is such as to provide an average residence time of gas within the bed of from about 5 to 15 seconds. Preferably, the rocks have a median diameter of from about 1 to 5 centimeters.

In accordance with a particularly preferred embodiment wherein the source of heat comprises a solar heat collector, the heat collecting liquid is a liquid alkali metal, the heat transfer gas is air, and the working fluid is water which is converted to steam. It has been found that by utilizing a bed of rocks, it is possible to store thermal energy which is recoverable at temperatures in a range of from 600° to 1200° F. or even higher. Further, contrary to popular opinion, it has been found that it is not necessary to use exotic gases or high pressures for the recovery of significant quantities of heat from the rocks, rather, ordinary air is utilizable at or near atmospheric pressure. These and numerous other advantages of the present invention will be more clear with reference to the following description of the invention.

DETAILED DESCRIPTION OF THE INVENTION

Figure 1:
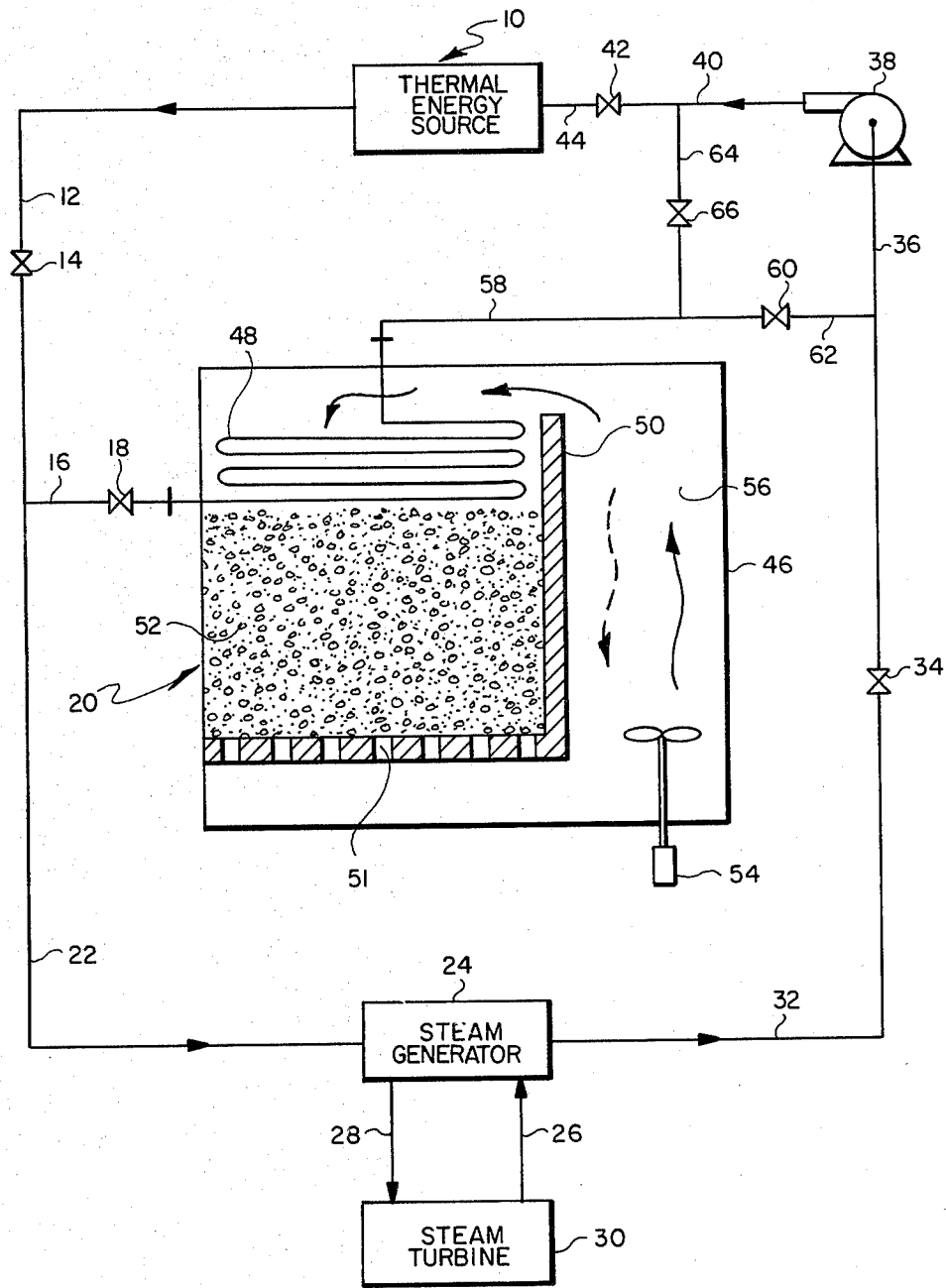
FIG. 1 is a schematic of a preferred embodiment of the system of the present invention.

For convenience, the present invention will be described with reference to the particularly preferred embodiment, namely, its use for the storage of solar thermal energy. Referring to FIG. 1, there is provided a thermal energy source 10 such as a central solar collector wherein the sun's energy is collected and focused on a heat exchanger through which passes a heat collecting liquid. The preferred heat collecting liquids are the alkali metals and the particularly preferred alkali metals are sodium, potassium and mixtures thereof. During the hours of peak solar insolation, the system is sized such that there is an excess of thermal energy collected by thermal energy source 10. The heat collecting liquid is withdrawn via a conduit 12, a valve 14, a conduit 16, and a valve 18 for introduction into a thermal energy storage system 20. Valve 18 is adjusted such that only the excess heat collecting liquid passes into the storage system. The balance of the heat collecting liquid passes through a conduit 22 for introduction into a steam generator 24. In the steam generator 24, the heat collecting liquid passes in indirect, heat-exchange relationship with a source of water introduced through a conduit 26. The water is heated to steam which is withdrawn via a conduit 28 for introduction into a steam turbine 30, wherein the thermal energy is converted to mechanical energy. The mechanical energy can be used for many purposes. However, in accordance with this particular preferred embodiment, the mechanical energy is utilized to drive a generator (not shown) to produce electricity. The heat collecting liquid passing through the steam generator 24 is returned to a pump 38 via a conduit 32, a valve 34, and a conduit 36. The heat collecting liquid is discharged from the pump 38 and returned to the thermal energy source 10 via a conduit 40, a valve 42 and a conduit 44.

The heat storage system 20 comprises an outer housing 46 within which is contained a heat exchanger coil 48, and an inner housing 50 having a bottom portion which is perforated with a plurality of openings 51 for the passage of air therethrough. The housing 50 also contains a bed of particulate heat storage material 52. It is an advantage of the present invention that suitable heat storage materials are inexpensive and readily available solid particulates such as rocks. Typical rocks suitable for use in the present invention are granite, limestone, syenite, basalt, dolomite, and marble. The size of the solid particles is not particularly critical. However, it is generally preferred that they have a median diameter of from about 0.5 to 10 centimeters and a particularly sized range is from about 1 to 5 centimeters. The shape of the rocks also is not critical and the random shapes and sizes obtained from a conventional rock milling or rock crushing apparatus are generally satisfactory. It is particularly desired for a system in accordance with the present invention, that the pressure drop through the bed of rocks be within the range of about 0.05 to 0.5 psi and preferably less than about 0.1 psi, since a high pressure drop requires more power to push air through the bed with a corresponding loss in system efficiency.

The pressure drop through the bed 52 is of course a function of the velocity of the gases passing therethrough, the height of the bed, and the size and shape of the rocks. However, it is well within the skill of one versed in this art to adjust these parameters to obtain the desired pressure drop. It is a critical parameter of the present invention that the velocity of the air flowing through the bed of rocks be within a certain range. Thus it is essential that the apparent velocity of the gas flowing through the bed of rocks be within the range of from about 1 to 6 feet per second and, preferably, within the range of from about 2 to 3 feet per second. The term "apparent velocity" refers to the velocity the gases would have assuming they were flowing uniformly throughout the cross sectional area of the bed.

The heat storage system 20 further includes a means for circulating air through the bed of rocks and a heat exchanger coil 48. In the drawing, the means for circulating air is depicted as a fan assembly 54 which circulates air through a duct 56 defined generally by the walls of the housing 20 and the container 50. The fan assembly 54 is provided with a reversible motor whereby in operation it can force the air to circulate upwardly through the duct 56 and down across the heat exchanger coil 48 then through the bed 52. Alternatively, it can be reversed to cause the air to flow upwardly through the openings 51, the bed 52, across the heat exchanger coil 48 and back into the duct 56. The heat exchanger coil 48 is connected to the inlet of the pump 38 via a conduit 58 and a valve 60. The discharge conduit 40 from the pump 38 is interconnected to heat exchanger coil 48 via a conduit 64, a valve 66 and conduit 58.

It will be readily apparent to those versed in the art that the system of the present invention is capable of operation in several modes. More particularly, in a direct mode when there is only sufficient thermal energy available to supply the requirements of the steam generator 24 and the steam turbine 30, valves 18, 66 and 60 are closed and valves 14, 34 and 42 are open, such that all the heat collecting liquid travels from the thermal energy source 10 through conduits 12 and 22 to the steam generator 24 and is discharged via conduits 40 and 44.

When there is an excess of thermal energy over that required by the steam generator 24, a portion of the heat collecting fluid is passed to the heat storage system 20 via conduit 16 and valve 18 where it flows upwardly through the heat exchanger coil 48 in indirect, counter-current, heat-exchange relationship with the heat collecting liquid, absorbing heat therefrom and then passes downwardly through the rock bed 52. The bed 52 absorbs the heat for later use.

When there is insufficient heat available from the thermal energy source 10, the fan assembly 54 is operated in a reverse direction such that the air flows upwardly through the openings 51, the bed 52, and through the heat exchanger coil 48. Valve 60 is closed and valve 66 is opened so the heat collecting fluid discharged from the pump 38 flows through conduits 40, 64, and 58 into the upper end of the heat exchanger coil assembly 48 such that again the air and heat collecting fluid pass in counter-current, indirect, heat-exchange relationship with one another. The hot heat collecting fluid is discharged via valve 18 and conduit 16 for passage to the steam generator 24 via conduit 22.

Figure 2:
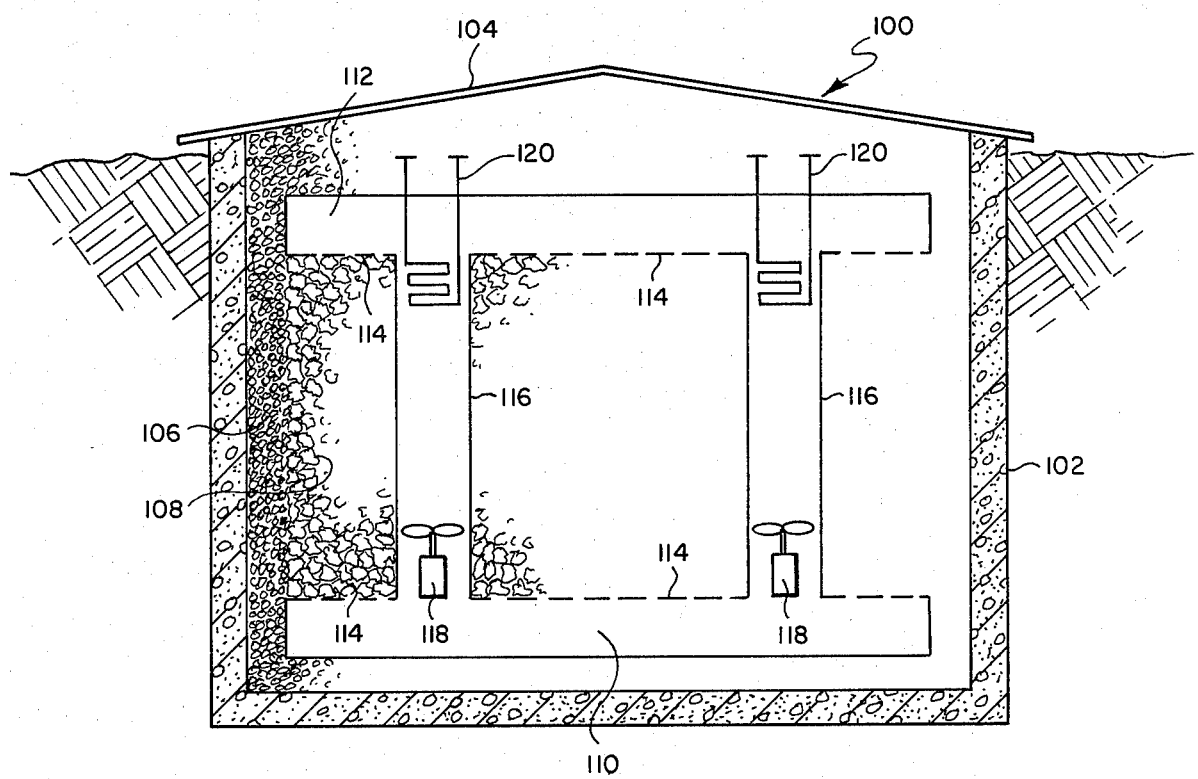
FIG. 2 is a pictorial drawing in cross section of a preferred embodiment of the heat storage subsystem of the present invention.

Referring now to FIG. 2 therein is depicted in cross sectional view a schematic of a preferred heat storage subsystem 100 of the present invention. The subsystem comprises an outer housing formed by walls 102 and the top 104 is a body of insulating material 106 such as porous slag, cinders and volcanic rock. A large bed of heat storage rock 108 also is located within the outer housing in an area bounded by a lower duct 110 and an upper duct 112. Each of these ducts is provided with a plurality of openings 114 on the side of the duct facing the heat storage material 108. The subsystem further includes two vertical ducts 116, each of which contain a reversible fan assembly 118 and a heat exchanger coil 120.

In a system designed, for example, to store about 800 to 1600 megawatt hours of thermal energy, the outer housing would comprise a square approximately 275 feet to the side and about 45 feet high. There also would be provided approximately 12 sets of the ducts 116, heat exchange coils 120, and fan assemblies 118, each set being substantially evenly spaced throughout the length of the outer housing. In such an embodiment, the ducts preferably are formed from inexpensive concrete pipe and would be, for example, about 4 feet in diameter. The walls for such a system also could readily be formed from concrete and would have a nominal thickness of from about 6 to 9 inches. The roof member 104 could be formed from corrugated sheet metal such as iron or aluminum. Thus, it is seen that the system of the present invention is readily fabricatable using inexpensive materials. Further, the length of the duct required in the embodiment depicted is substantially minimized, thus reducing the cost of the duct, heat losses and reducing the fan requirements.

The twenty-four fan assemblies in the ducts described would circulate air at atmospheric pressure at the rate of about 3-million cubic feet per minute. Such a system is capable of supplying sufficient thermal energy to provide all the heat requirements for a 100-megawatt electric utility plant for a period of from about 3 to 6 hours when the rocks are at a temperature of from about 600°–1200° F. Obviously, additional subsystems could be provided to supply heat for further extended periods of time to provide a heat storage system which could readily provide all the thermal requirements of the utility plant during non-daylight hours. It will be appreciated that the configuration depicted is not critical and indeed, in some instances, a rectangular or round housing might be preferred. Further, the location of the fan and heat exchanger with the ducts could readily be altered. It will also be obvious that the present invention could be built in modules of varying desired sizes.

It will be appreciated that the particular embodiments depicted are illustrative only, and various configurations and arrangements of equipment are possible. Indeed, in actual practice there would be many more valves as well as instrumentation lines and controllers for automatic operation. However, the placement of such additional equipment and selection of such accessories is a matter of design choice and well within the skill of one versed in the art.

What is claimed is:

1. A thermal energy storage system comprising:
   a source of heat for heating a heat collecting liquid to a temperature within the range of from about 600° to 1200° F.;
   a housing containing a bed of rocks for storage of thermal energy;
   a heat transfer gas in heat-exchange relationship with said bed of rocks;
   means for moving said heat transfer gas through said bed of rocks at an apparent velocity of from about 1 to 6 ft/sec;
   means for causing said heat collecting liquid and said heat transfer gas to flow in counter-current, indirect, heat-exchange relationship with one another, said means including means for reversing the direction of flow of said liquid and said gas;
   a working fluid;
   means for passing said working fluid and said heat collecting liquid in indirect, heat-exchange relationship with one another; and
   means operatively associated with said working fluid to convert thermal energy contained therein to mechanical energy.

2. The system of claim 1 wherein the heat collecting liquid is selected from the group consisting of sodium, potassium, and mixtures thereof.

3. The system of claim 1 wherein said heat transfer gas is air.

4. The system of claim 1 wherein said rocks have a median diameter of from about 1 to 5 cm.

5. The system of claim 1 wherein said working fluid is water.

6. The system of claim 1 wherein said first-named means further provides for the introduction and withdrawal of heated heat transfer gas from an upper portion of said bed of rocks.

7. A thermal energy system comprising: a solar heat collector for heating a heat collecting liquid alkali metal to a temperature within the range of from about 600° to 1200° F.;
   a housing containing a bed of rocks for storage of thermal energy;
   a heat transfer gas in heat-exchange relationship with said bed of rocks, said heat transfer gas comprising air;
   means for moving said air through said bed of rocks at an apparent velocity of from about 1 to 6 ft/sec;
   means for causing said liquid alkali metal and said air to flow in counter-current, indirect, heat-exchange relationship with one another, said means including means for reversing the flow of said liquid alkali metal and said air for the introduction or withdrawal of heated air from an upper portion of said bed of rocks;

means for passing said liquid alkali metal in indirect heat-exchange relationship with a source of water whereby said water is converted to steam; and means operatively associated with said steam to extract mechanical energy therefrom.

8. The system of claim 7 wherein the alkali metal is selected from the group consisting of sodium, potassium, and mixtures thereof.

9. The system of claim 8 wherein said rocks have a median diameter of from about 1 to 5 cm.

10. The system of claim 9 wherein said air is substantially at atmospheric pressure.

11. A method of storing and recovering thermal energy comprising:

providing a source of heat and a heat collecting liquid;

passing the heat collecting liquid in a heat-exchange relationship with the source of heat;

providing a housing containing a bed of rocks for storage of thermal energy and a heat transfer gas in direct heat-exchange relationship with said bed of rocks;

passing said heat collecting liquid and said heat transfer gas in a counter-current, indirect, heat-exchange relationship with one another, said heat transfer liquid and said heat transfer gas being maintained at a temperature within a range of from about 600° to 1200° F.;

passing said heat transfer gas through said bed of rocks at an apparent velocity within a range of from about 1 to 6 ft./sec;

reversing the direction of the flow of said liquid and said gas such that heated gas is introduced or withdrawn from an upper portion of said bed of rocks;

providing a working fluid;

passing said working fluid and said heat collecting fluid in heat exchange relationship with one another to transfer heat to the working fluid; and extracting energy from said heated working fluid.

* * * * *